(12) United States Patent
Zhou et al.

(10) Patent No.: US 7,336,884 B2
(45) Date of Patent: Feb. 26, 2008

(54) ADAPTIVE DEVICE FOR SHIFTING IMAGING AXIS ACROSS FIBER-OPTIC ENDFACES IN MULTI-FIBER CONNECTOR FOR INSPECTION

(75) Inventors: Ge Zhou, Kent, WA (US); Shangyuan Huang, Kent, WA (US)

(73) Assignee: Lightel Technologies Inc., Kent, WA (US)

( * ) Notice: Subject to any disclaimer, the term of this patent is extended or adjusted under 35 U.S.C. 154(b) by 0 days.

(21) Appl. No.: 11/459,016

(22) Filed: Jul. 20, 2006

(65) Prior Publication Data

US 2008/0019656 A1    Jan. 24, 2008

(51) Int. Cl.
*G02B 6/00* (2006.01)

(52) U.S. Cl. .................. 385/134; 385/90; 385/133; 359/368; 359/382; 359/379; 359/694; 359/384

(58) Field of Classification Search .......... 359/379, 359/384, 391–392, 362–363, 367–390; 385/133–134, 385/90

See application file for complete search history.

(56) References Cited

U.S. PATENT DOCUMENTS

| | | | |
|---|---|---|---|
| 6,466,366 B1 * | 10/2002 | Dominique | ............... 359/379 |
| 6,751,017 B2 | 6/2004 | Cassady | |
| 6,879,439 B2 * | 4/2005 | Cassady | ................ 359/382 |

* cited by examiner

*Primary Examiner*—Brian Healy
*Assistant Examiner*—Guy G Anderson
(74) *Attorney, Agent, or Firm*—Pai Patent & Trademark Law Firm; Chao-Chang David Pai (57) ABSTRACT

A device for shifting the imaging axis of a microscope across the endfaces of a multi-fiber connector for inspecting the fiber-optic endfaces through the microscope comprises a supporting body for attaching at one end to the optical tube of a microscope; a pendular arm rotatably mounted to another end of the supporting body; a fitting tip attached to another end of the pendular arm; a bevel wheel fastened to the supporting body; and a torsion spring for pushing the pendular arm against a slanted surface of the bevel wheel. The bevel wheel is adapted to swing the pendular arm relative to the supporting body so that the imaging axis of the microscope is moved relative to the fitting tip to selectively align the imaging axis between adjacent fiber-optic endfaces for inspection.

14 Claims, 7 Drawing Sheets

ADAPTIVE DEVICE FOR SHIFTING IMAGING AXIS ACROSS FIBER-OPTIC ENDFACES IN MULTI-FIBER CONNECTOR FOR INSPECTION

BACKGROUND OF THE INVENTION

1. Field of the Invention

The invention relates to fiber-optic connector inspection microscopes and more particularly to an adaptive device for shifting the imaging axis of a microscope across the endfaces of a multi-fiber connector for inspecting the fiber-optic endfaces through the microscope.

2. Description of the Related Art

The widespread implementation of fiber-optic communications for high-density interconnections has driven more and more multi-fiber connectors to be adopted in the industry. This creates an urgent need for regularly inspecting and maintaining the multi-fiber connectors in place, which are often situated behind backplanes or in locations which are very difficult to access.

It is well known in the fiber-optic communication industry that the endfaces of optical fibers within communication systems must be kept clean and undamaged, otherwise serious signal loss could result. The demand for cleanliness for fiber-optic endfaces has become even more stringent as the communication bandwidths increase and new communication technology requiring higher laser power is applied.

Many types of microscopes are already available for inspecting the endface of a fiber-optic connector to make sure the endface is undamaged and clean. Due to the need for sufficient magnification, the fiber-optic endface is typically inspected only one at a time. For example, the endface with a typical diameter of 0.125 mm can be inspected with a microscope with a field of view of about 0.3 mm×0.4 mm only one at a time. For a multi-fiber connector, with the centers of the fiber-optic endfaces spaced typically at 0.25 mm, the microscope must be able to scan from one side to the other side of the connector in order to inspect each of the fiber-optic endfaces. Therefore an adaptive device is needed to bring the fiber-optic endfaces one by one within the field of view of the microscope for inspection.

Cassady (U.S. Pat. Nos. 6,751,017 and 6,879,439) discloses a microscope for inspecting fiber-optic endfaces in a multi-fiber connector. The microscope comprises a tip capable of interfacing with the multi-fiber connector, a slider assembly, a slider chassis and a drive assembly, in which the driver assembly interfaced with the slider assembly is capable of selectively displacing the slider chassis along an axis of motion to selectively direct the imaging axis of the microscope between adjacent fiber-optic endfaces.

The present invention provides a novel design for such a device, wherein a fitting tip is used to attach the device to the multi-fiber connector; a pendular arm is used to scan the endfaces to be inspected, a bevel wheel with a slanted or spiral surface is used to displace the pendular arm for aligning a microscope with individual endfaces.

BRIEF SUMMARY OF THE INVENTION

In this invention a device for shifting the imaging axis of a microscope across the endfaces of a multi-fiber connector for inspecting the fiber-optic endfaces through the microscope is provided. The device is capable of bringing each fiber-optic endface of the multi-fiber connector one by one into the field of view of the microscope for inspection.

The device comprises a supporting body, a pendular arm, a torsion spring, a fitting tip, and an adjustment driver. The supporting body has one end attaching to the optical tube of a microscope and has a far end extended away from the microscope-imaging axis. The pendular arm is rotatably mounted to the far end of the supporting body, and its free end is extended back toward the optical tube. A relative angular swing between this arm and the supporting body allows a relative movement between the free end of the pendular arm and the microscope-imaging axis. The torsion spring is disposed between the supporting body and the pendular arm to push the pendular arm relative to the supporting body in a predetermined rotational direction. The fitting tip is designed to interface with a multi-fiber connector through a connector adaptor; the fitting tip is attached to the free end of the pendular arm at a level such that the imaging axis of the microscope passes through a point near the center of the fitting tip. The adjustment driver is disposed to interface with the supporting body and the pendular arm and is adapted to swing the supporting body relative to the pendular arm, against the elastic force exerted by the torsion spring, thereby moving the imaging axis relative to the fitting tip along a circular track to selectively align the imaging axis between adjacent fiber-optic endfaces for inspection.

In a preferred embodiment of the device according to the present invention, the adjustment driver is a bevel wheel with a slanted or spiral surface facing the pendular arm and the supporting body; the bevel wheel is fastened to the supporting body by a shaft, allowing the slanted surface to turn around; and a bulge is formed on a side of the pendular arm for contacting the slanted surface. As the bevel wheel turns, so does the slanted surface, pushing the pendular arm to swing to and fro relative to the supporting body due to varying height around the slanted surface. As a result, the imaging axis may be selectively aligned with individual fiber-optic endfaces through the fitting tip. In an alternative embodiment, the bevel wheel is fastened to the pendular arm and the bulge is formed on a side of the supporting body for contacting the slanted surface of the bevel wheel.

Since the imaging axis of the microscope is moved in a circular track in aligning with the fiber-optic endfaces normally arranged in a straight line, there exists an offset in aligning the imaging axis, which would vary from endface to endface. An analysis of the alignment offset is given in the detailed description of the invention below to provide some insight into how the device should preferably be designed from known parameters, such as the size of the multi-fiber connector, optical characteristics of the microscope, desired offset level, etc.

DETAILED DESCRIPTION OF THE INVENTION

Figure 1:
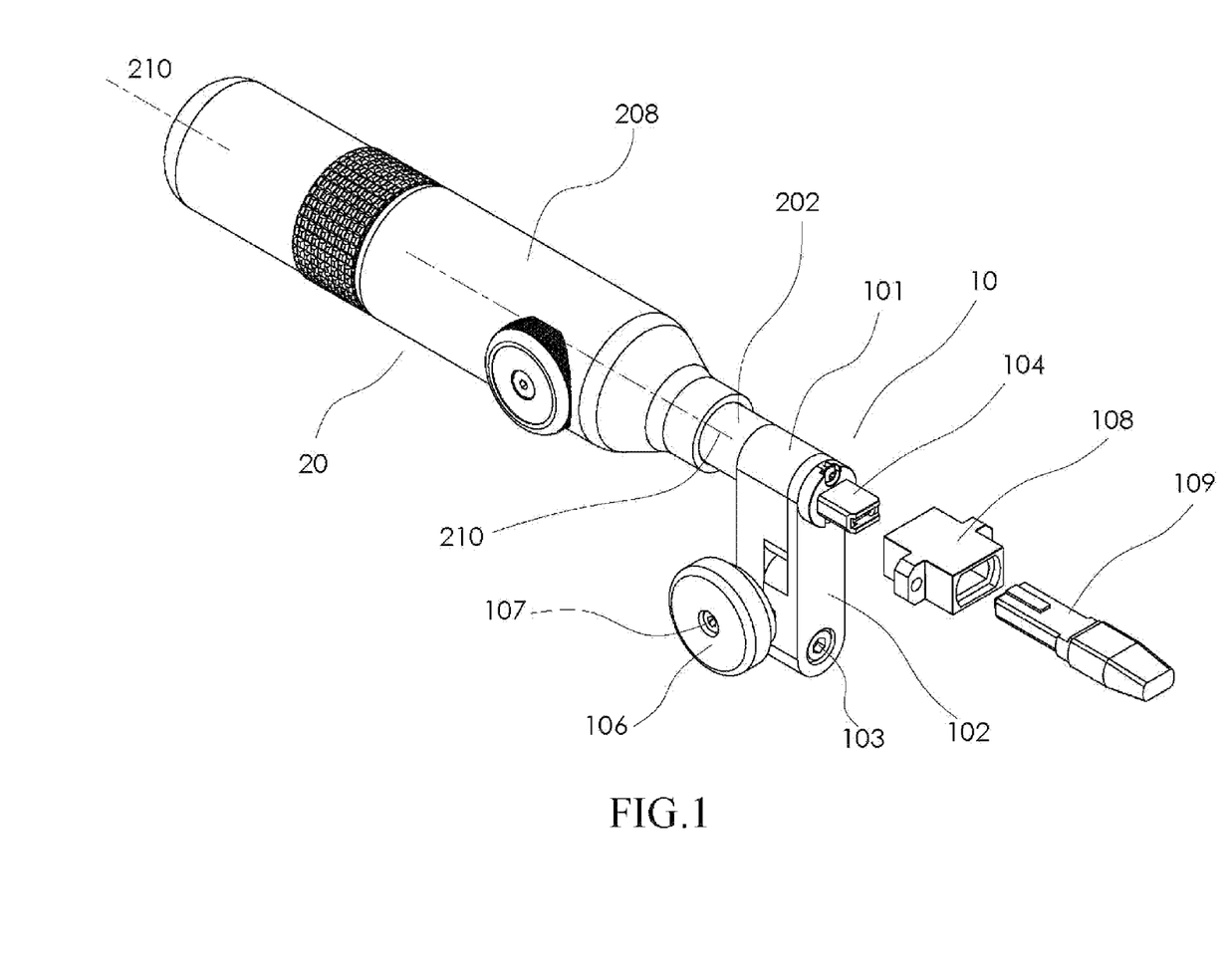
FIG. 1 illustrates the device for shifting the imaging axis of a microscope across the fiber-optic endfaces of a multi-fiber connector for inspecting the fiber-optic endfaces through the microscope according to a preferred embodiment of the present invention, together with a microscope, a multi-fiber connector and a connector adaptor.

FIG. 1 illustrates the adaptive device 10 for shifting the imaging axis of a microscope across the fiber-optic endfaces of a multi-fiber connector for inspecting the fiber-optic endfaces according to a preferred embodiment of the present invention, shown together with a handheld microscope 20, a multi-fiber connector 109 and a connector adaptor 108. The microscope 20 has a microscope body 208 and an optical tube 202 at the front end of the microscope 20. In addition, the imaging axis 210 of the microscope 20, which points at the center of the field of view of the microscope 20, is also shown in FIG. 1.

Figure 2:
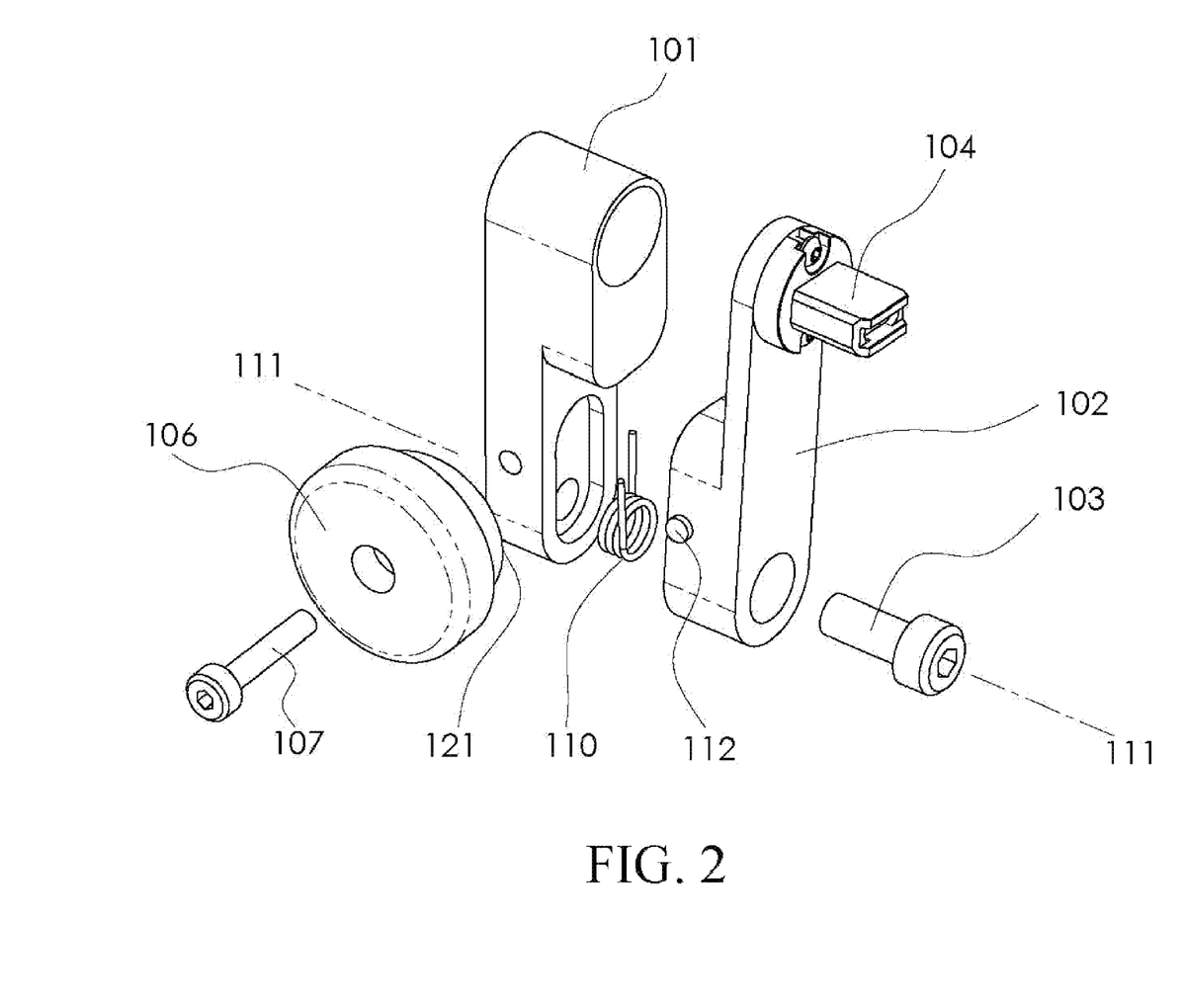
FIG. 2 shows an exploded view of the device shown in FIG. 1.

FIG. 2 is an exploded view of the device 10 in FIG. 1. As illustrated in FIGS. 1 and 2, the adaptive device 10 comprises a supporting body 101, a pendular arm 102, a fitting tip 104, a torsion spring 110, and a bevel wheel 106. Each of these components will be described in detail in the following.

The supporting body 101 has a first end portion for attaching to the optical tube 202 of the microscope 20 and a second end portion extended in a radial direction from the optical tube 202 of the microscope 20. The pendular arm 102 is rotatably mounted at one end with a shaft 103 to the second end portion of the supporting body 101. The axis of the shaft 103 is parallel with the imaging axis 210. The free end of the pendular arm 102 extends toward the optical tube 202 of the microscope 20. Thus, the pendular arm 102 can swing around a pendular axis 111, which coincides with the axis of the shaft 103, and shift its position relative to the supporting body 101 and the optical tube 202. Because the pendular axis 111 is parallel with the imaging axis 210, the pendular arm 102 swings in a plane perpendicular to the imaging axis 210.

The fitting tip 104 is attached to the free end of the pendular arm 102. The fitting tip 104 is designed to be capable of interfacing with a multi-fiber connector 109 through a connector adaptor 108. When the pendular arm 102 is swung relative to the supporting body 101, the fitting tip 104 is also swung relative to the optical tube 202 and therefore the imaging axis 210 of the microscope 20, allowing the imaging axis 210 to pass through the fitting tip 104 and be selectively aligned with a certain fiber-optic endface in the multi-fiber connector 109.

Figure 3A:
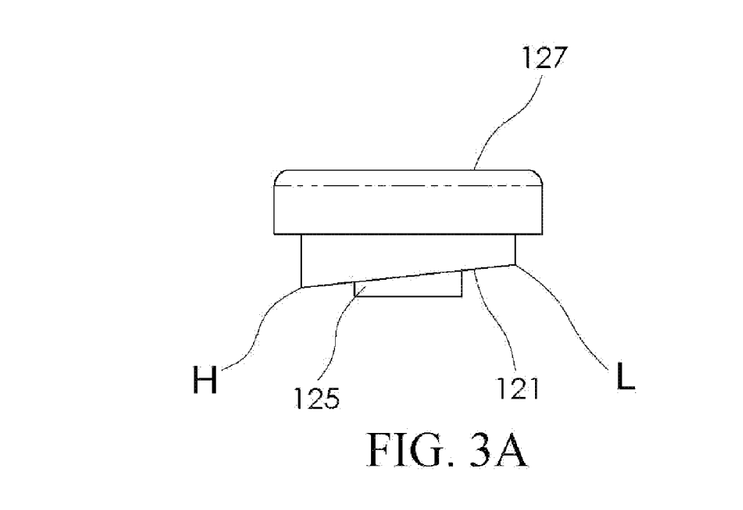
FIGS. 3A-3D show various views of the bevel wheel with a slanted surface for the device according to a preferred embodiment of the present invention.
Figure 3B:
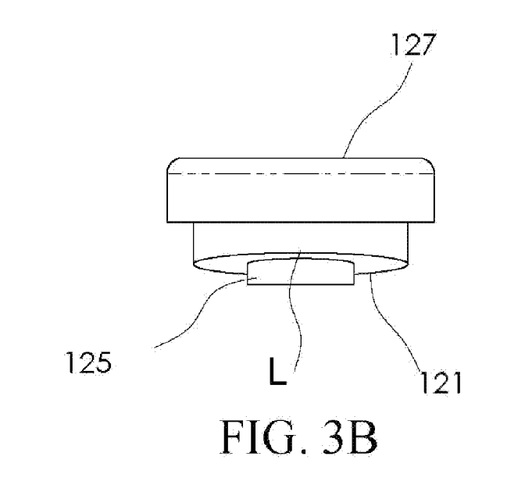
Figure 3C:
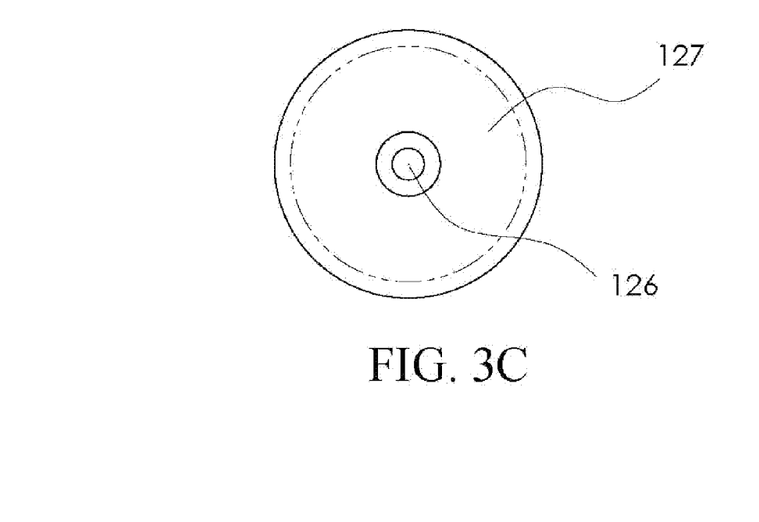
Figure 3D:
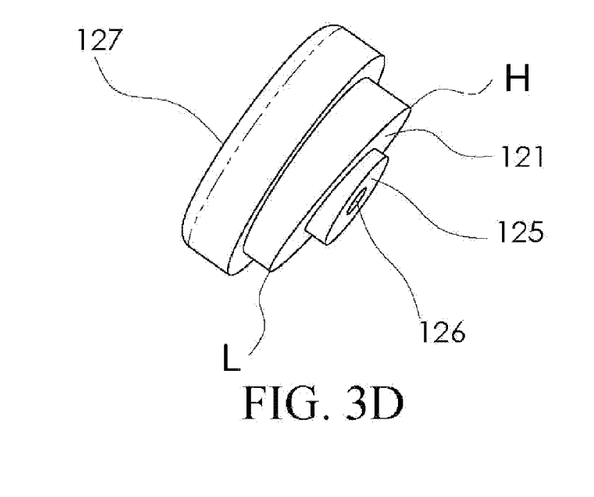
Figure 3E:
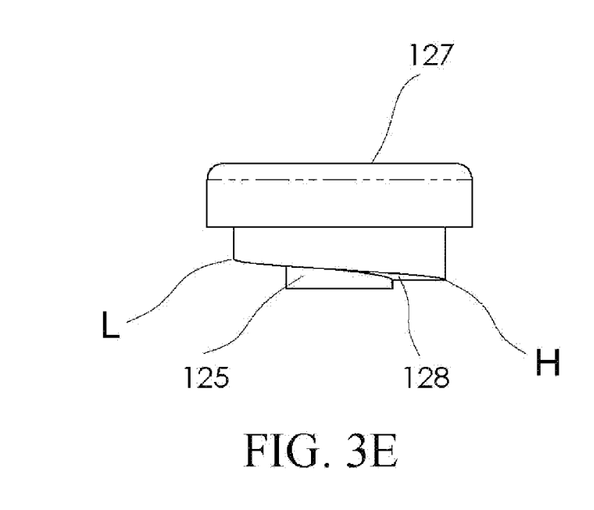
FIGS. 3E-3H show various views of the bevel wheel with a spiral surface for the device according to another preferred embodiment of the present invention.
Figure 3F:
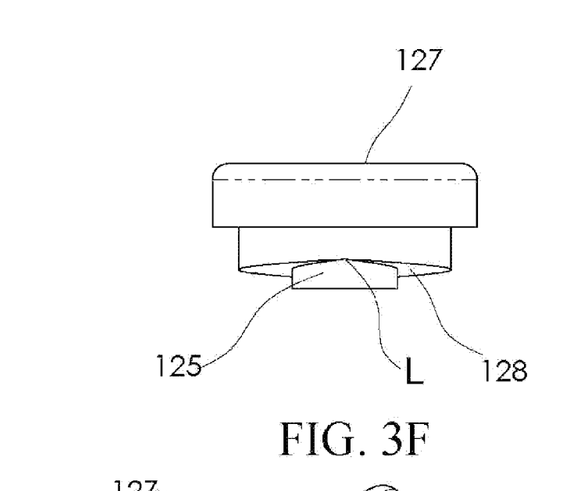
Figure 3G:
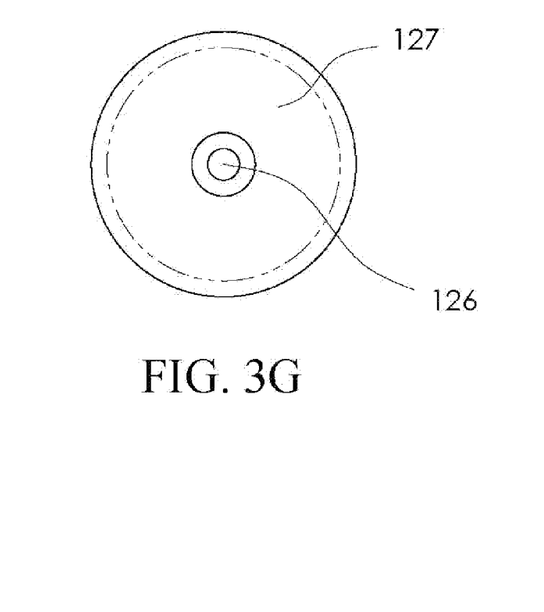
Figure 3H:
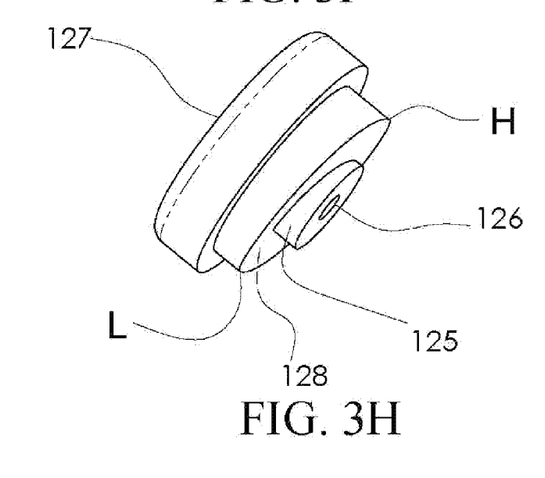

The structure of the bevel wheel is further illustrated in FIGS. 3A-3D. The bevel wheel 106 is mounted on a wheel shaft 107 fastened through a center hole 126 to a side of the supporting body 101. FIG. 3D is a perspective view of the bevel wheel 106, which has on its inner side a center portion 125 enclosing the center hole 126 and an annular slanted surface 121 around the center portion 125. The center portion 125 projects further than the highest point H of the slanted surface 121 so that the bevel wheel 106 is allowed to turn freely around the wheel shaft 107. FIG. 3A shows a lateral elevation view of the bevel wheel 106, showing the highest point H and the lowest point L of the slanted surface 121. FIG. 3B shows another lateral elevation view of the bevel wheel 106, showing in the middle the lowest point L of the slanted surface 121.

FIG. 3C shows a plan view of the bevel wheel 106 from the outer side 127. Admittedly, the structure of a bevel wheel as described above and other functional equivalents are well-known to one of ordinary skill in the relevant art. Therefore, no further description is needed.

In FIG. 2, a bulge 112 is formed on the side of the pendular arm 102 facing the slanted surface 121 of the bevel wheel 106. The torsion spring 110 is disposed between the supporting body 101 and the pendular arm 102 to constantly push the pendular arm 102 to swing counterclockwise relative to the supporting body 101, thus pushing the bulge 112 on the pendular arm 102 against the slanted surface 121 of the bevel wheel 106. In this embodiment, the torsion spring 110 loops around the shaft 103 of the pendular arm 102 to be fixed in position. However, other functionally equivalent variations can be easily provided by one of ordinary skill in the relevant art and will not be discussed here.

Figure 4A:
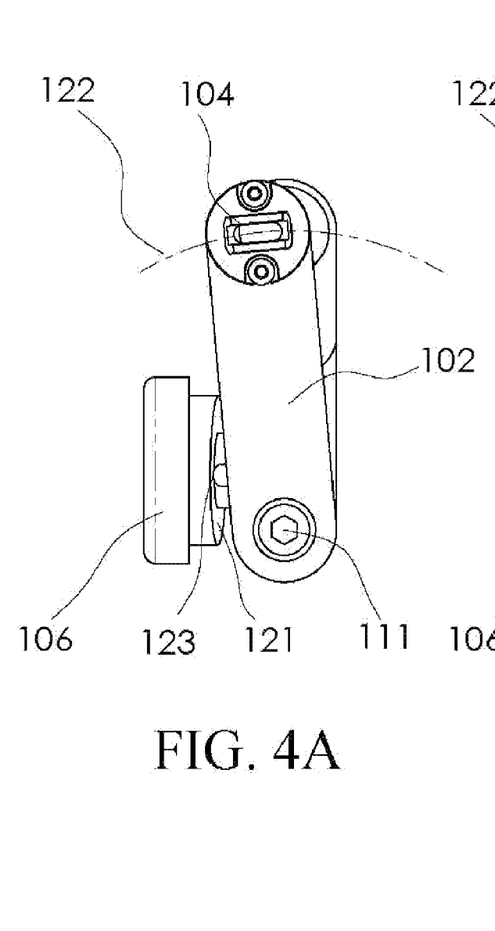
FIGS. 4A-4C show three positions of the pendular arm and the fitting tip relative to the imaging axis as the bevel wheel shown in FIGS. 3A-3D is turned around.
Figures 4B, 4C:
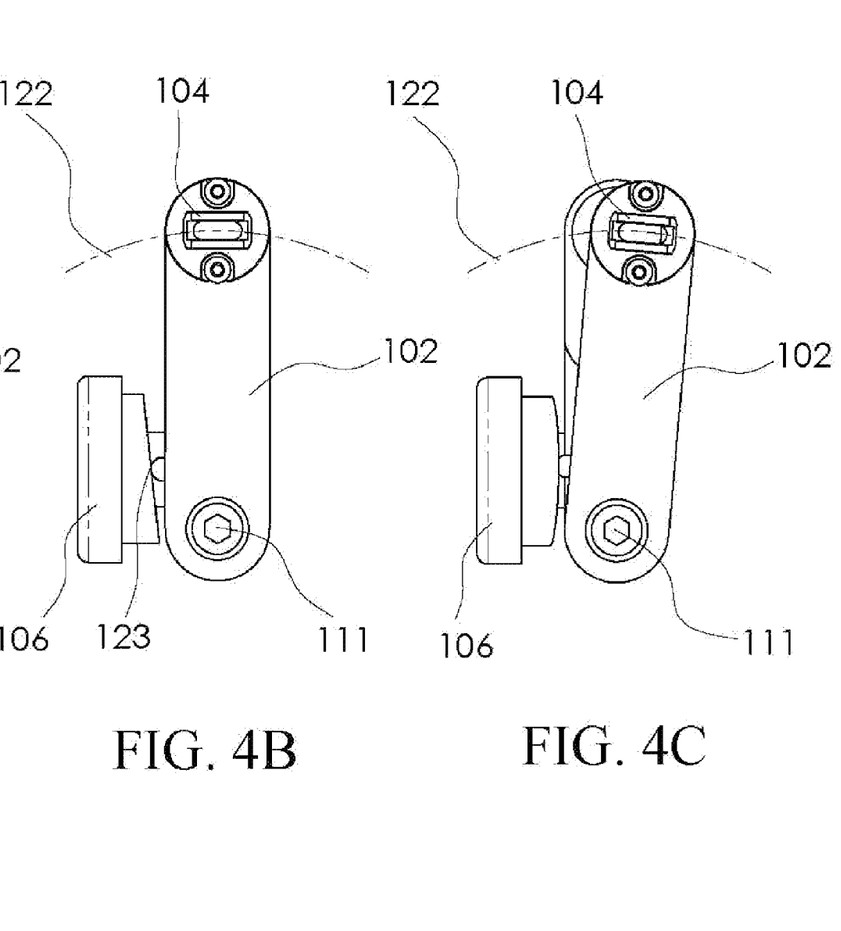

Referring to FIGS. 4A-4C, when the bevel wheel 106 is turned around the wheel shaft 107, the point of contact 123 between the slanted surface 121 of the bevel wheel 106 and the bulge 112 on the pendular arm 102 will travel along a circle on the slanted surface 121 and be displaced back and forth relative to the base of the slanted surface 121. Thus, the pendular arm 102 and therefore the fitting tip 104 will be swung to and fro, against the force exerted by the torsion spring 110, relative to the supporting body 101. As a result, the fitting tip 104 will be swung to and fro relative to the imaging axis 210 of the microscope 20 attached to the supporting body 101. FIGS. 4A-4C show three positions of the pendular arm 102 relative to the fitting tip 104, as viewed from the side opposite to the optical tube 202. Each of the three positions corresponds to a different angular position of the slanted surface 121. As shown in FIG. 4A, when the point of contact 123 between the slanted surface 121 and the bulge 112 is at the lowest point L of the slanted surface 121, the fitting tip 104 is at its leftmost point. On the contrary, as shown in FIG. 4C, when the point of contact 123 is at the highest point H of the slanted surface 121, the fitting tip 104 is at its rightmost point. When the point of contact 123 is at an intermediate height, as illustrated in FIG. 4B, the fitting tip 104 is at a corresponding intermediate point. Note that the imaging axis 210 is shifted to and fro relative to the fitting tip 104 along a circular track 122 as the bevel wheel 106 is turned around. More specifically, the imaging axis 210 is shifted from the leftmost point to the rightmost point as the bevel wheel 106 is turned a half round (180°), and from the rightmost point back to the leftmost point as the bevel wheel 106 is turned 180° in the reverse direction (or in the same direction).

When the slanted surface 121 of the bevel wheel 106 is flat, as in FIGS. 3A-3D, the angle by which the bevel wheel 106 is turned does not have a linear relationship with the height of the slanted surface 121 at the point of contact 123. Namely, to achieve a given amount of change in the height of the slanted surface 121, thus shifting the imaging axis 210 by a given distance, the bevel wheel 106 will have to be turned progressively more as the point of contact 123 moves from the intermediate height (FIG. 4B) toward the lowest point (FIG. 4A) or the highest point (FIG. 4C). The nonlinearity is undesirable and can be corrected with a bevel wheel 106 with a spiral slanted surface 128, as shown in FIGS. 3E-3H. The spiral slanted surface 128 is formed such that the height of the surface at the point of contact 123 changes linearly with the angle by which the bevel wheel 106 is turned. As a result, the imaging axis 210 will be shifted evenly across the fiber-optic endfaces as the bevel wheel 106 with the spiral slanted surface 128 is being turned.

In an alternative embodiment, the bevel wheel 106 is mounted on the wheel shaft 107 fastened to the pendular arm 102 (instead of the supporting body 101), and the bulge 112 is formed on a side of the supporting body 101 for contacting the slanted surface 121 of the bevel wheel 106.

Moreover, for best view, the pendular arm 102 is required to swing in a plane perpendicular to the imaging axis 210.

Figure 5:
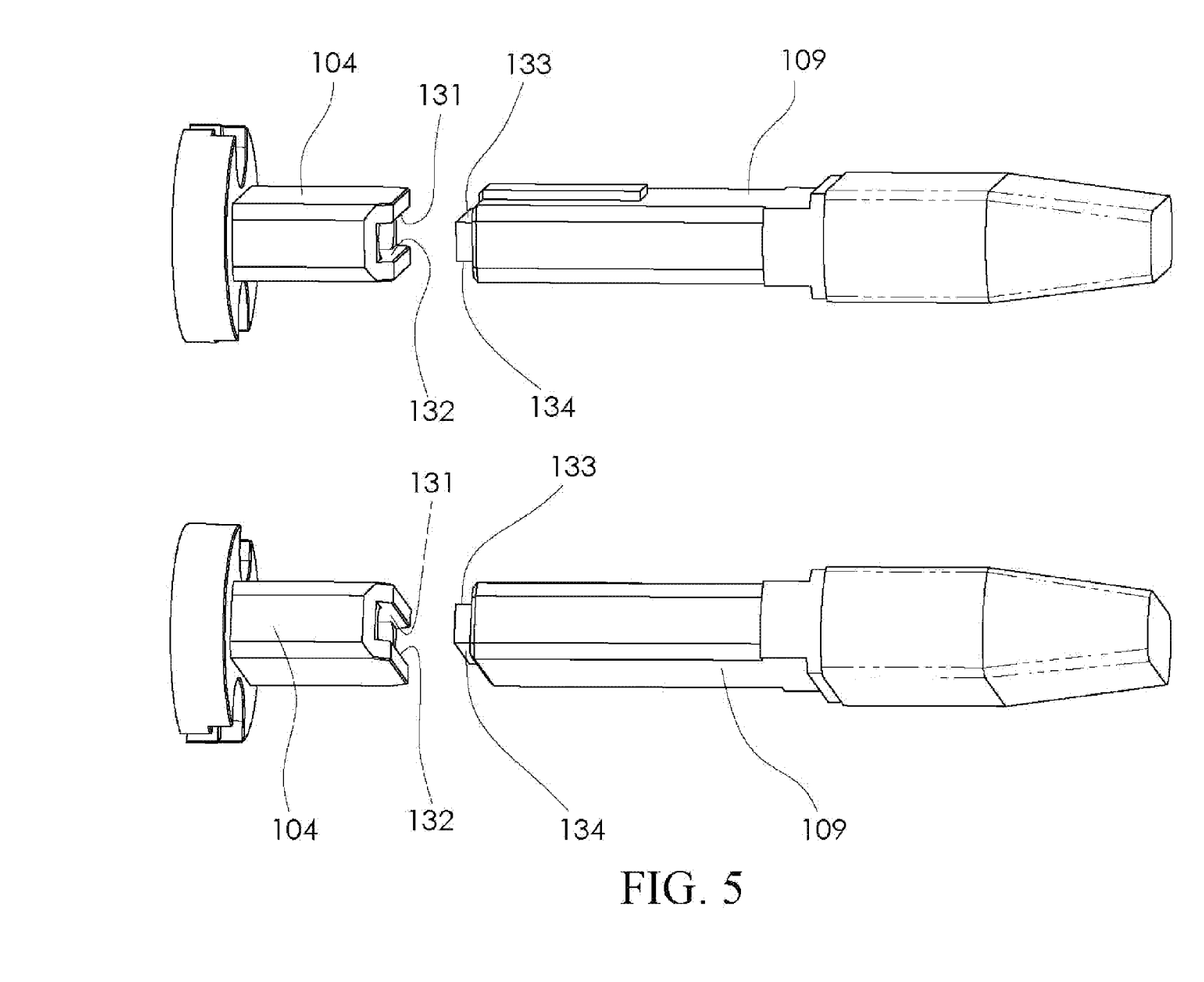
FIG. 5 illustrates an improved interface between the fitting tip of the device shown in FIG. 1 and a multi-fiber connector inside a connector adaptor.

FIG. 5 illustrates an improved interface between the fitting tip 104 and a multi-fiber connector 109 inside a connector adaptor 108. (Note that, in order to clearly show the interfacing between 104 and 109, the adapter 108 is not shown in FIG. 5.) In connection, the fitting tip 104 is inserted into one end of the connector adaptor 108 and the multi-fiber connector 109 is inserted into the other end of the connector adaptor 108 for the two to interface with each other. However, due to the relatively loose tolerance of the inner structure of adapters 108, the connection is usually not firm enough and the fitting tip 104 and the multi-fiber connector 109 may go out of alignment inside the connector adaptor 108, making it very difficult to align the imaging axis 210 with the fiber-optic endfaces. To prevent this, the fitting tip 104 is shaped to have a recessed front end for tightly mating with the facing end of the multi-fiber connector 109. As a result, the inside top surface 131 and the inside bottom surface 132 of the recessed mouth of the fitting tip 104 will be in tight contact respectively with the top surface 133 and the bottom surface 134 of the facing tip of the multi-fiber connector 109.

Every microscope has a field of view (FOV) within which an object can be acceptably viewed. The axis extending through the center of the FOV of the microscope is called the imaging axis. To inspect the endface of an optical fiber with the microscope, the imaging axis of the microscope should be aligned as close to the center of the fiber-optic endface as possible.

As shown in FIG. 1, the imaging axis 210 of the microscope 20 coincides with the straight line running through the center of the microscope body 208 and the optical tube 202. Thus, when the fitting tip 104 is interfaced with a multi-fiber connector 109, the individual fiber-optic endfaces in the multi-fiber connector 109 can be viewed and inspected by turning the bevel wheel 106 to swing the supporting body 101 (thus the optical tube 202) relative to the fitting tip 104 to selectively align the imaging axis 210 with the fiber-optic endface to be inspected. More specifically, when the bevel wheel 106 is turned toward the position as in FIG. 4A, the imaging axis 210 will be aligned through the fitting tip 104 toward the leftmost endface in the multi-fiber connector 109, as viewed from the microscope 20. On the other hand, when the bevel wheel 106 is turned toward the position as in FIG. 4C, the imaging axis 210 will be aligned through the fitting tip 104 toward the rightmost endface in the multi-fiber connector 109.

Since the fiber-optic endfaces in a multi-fiber connector 109 are normally arranged in a straight line, whereas the imaging axis 210 is shifted along a circular track, the imaging axis cannot always be precisely aligned vertically with the center of every endface and there exists an vertical alignment offset, the size of which depends upon the position of the fiber-optic endface. FIG. 7 depicts the FOV of the microscope 20 relative to the fiber-optic endfaces in a multi-fiber connector according to a preferred embodiment of the present invention. In this embodiment, when the FOV is symmetrically placed at the endface of the center fiber a, the imaging axis 210 falls slightly above the center of the endface, whereas when the FOV is symmetrically placed at the endface of either of the two outermost fibers c, the imaging axis 210 falls slightly below the center of the endface. An analysis of the alignment offset is given below.

Again referring to FIG. 6, Ra denotes the distance between the center of the endface of the center fiber a and the pendular axis 111 of the pendular arm 102, Rc denotes the distance between the center of the endface of either of the outermost fibers c and the pendular axis 111, and Rb denotes the distance between the imaging axis 210 and the pendular axis 111. Furthermore, A, B and C denote the circular tracks traced by the radii Ra, Rb and Rc, respectively, about the pendular axis 111. It is assumed in this illustration that the fitting tip 104 is placed at a position such that Rb=(Ra+Rc)/2. Thus, the alignment offset for the outermost endfaces (Rc−Rb) and the alignment offset for the center endface (Rb−Ra) are the same, as denoted by d in FIG. 6. It can be seen from FIG. 6 that the alignment offset for all the other endfaces between the center endface and the outermost endfaces is smaller than the maximum offset d.

Figure 6:
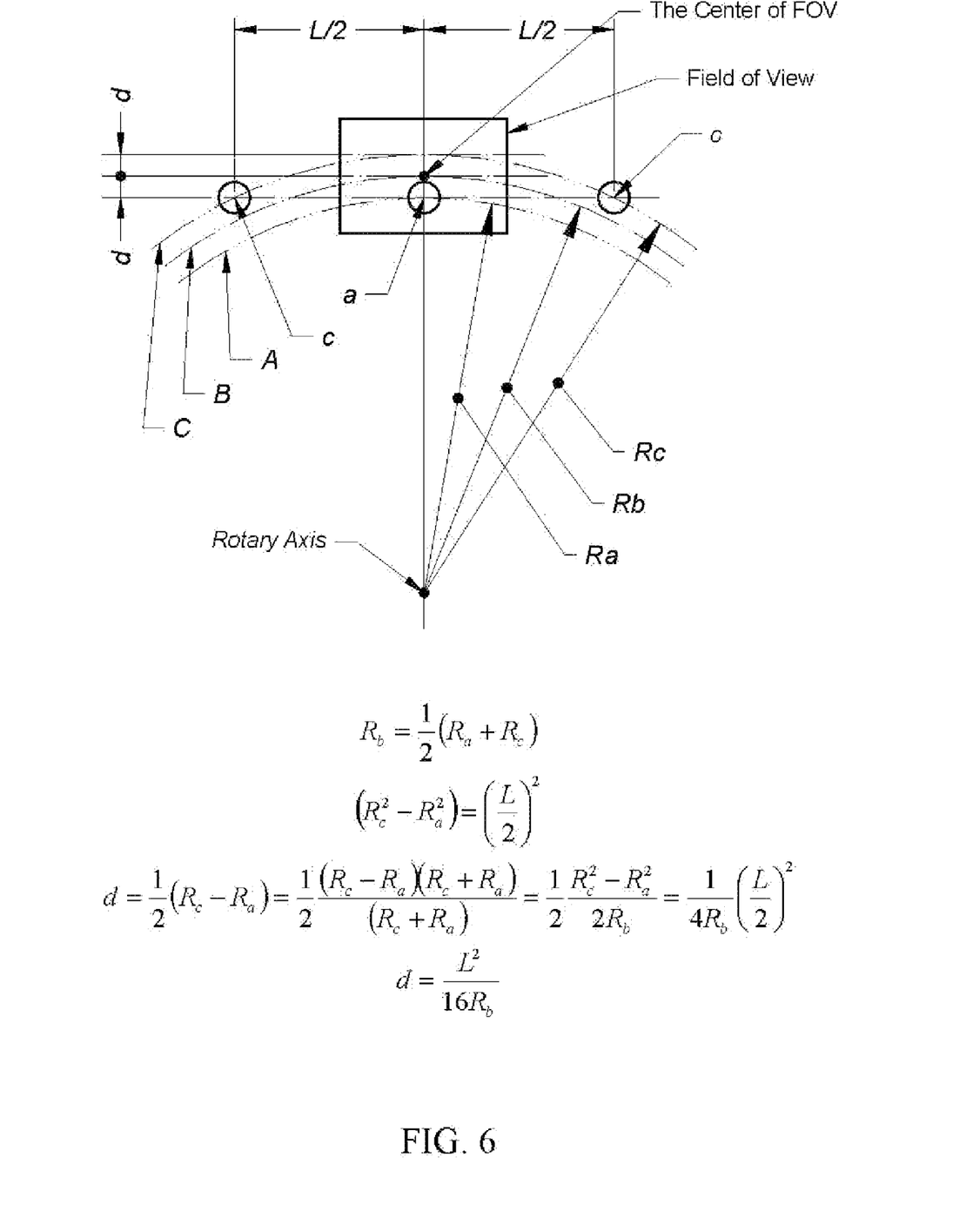
FIG. 6 shows an analysis and calculation of the maximum offset of the imaging axis from fiber-optic endfaces for a preferred embodiment of the present invention.

It is deduced in FIG. 6 that the maximum offset d can be calculated by the formula, $$d=L^2/16Rb$$

wherein L is the distance between the center points of the two outermost endfaces. Thus, for a typical MTP connector with L=3.4 mm, the maximum offset d will be 0.018 mm when Rb is set to 40 mm. For a typical FOV, which is about 0.4 mm wide and 0.3 mm high, the ratio of the maximum offset d to the height of the FOV is 0.018/0.3 or 6%, well within the acceptable tolerance of 10%.

In the foregoing analysis, the value of Rb, which stands for the distance between the imaging axis 210 and the pendular axis 111 of the pendular arm 102, is assumed to be 40 mm. Since the value of Rb directly affects the size of the device but is inversely proportional to the maximum offset d, other Rb values may be chosen for achieving a desirable compromise between the size and the maximum imaging offset for the device of the present invention.

From the foregoing analysis, it is clear that the maximum offset will be larger if the value of Rb is other than (Ra+Rc)/2. In other word, if the FOV cannot be placed at a proper level above the pendular axis 111, the endfaces may not be viewed with acceptable optical quality. For instance, if. Rb=Rc or Rb=Ra, then the maximum offset would be twice the value of d as calculated above, and the ratio of the maximum offset to the height of the FOV in the same example would be 12%, which would exceed the acceptable tolerance of 10%.

In the foregoing analysis, the pendular arm 102 and the fitting tip 104 are swung "relative to" the optical tube 202 of the microscope 20, therefore relative to the imaging axis 210. Thus, the pendular arm 102 and the fitting tip 104 may be stationary while the imaging axis 210 is swung, or vice versa. For example, when the multi-fiber connector 109 to be inspected is physically fixed in position (e.g. when installed behind communication system backplates), the pendular arm 102 and the fitting tip 104 will be fixed in position while the optical tube 202 and the imaging axis 210 is swung to and fro. On the other hand, if the multi-fiber connector 109 is movable, then both the pendular arm 102 and the imaging axis 210 can be swung to and fro. After all, it is the relative position between the two that determines which of the fiber-optic endfaces is aligned with the imaging axis 210.

What is claimed is:

1. A device for shifting the imaging axis of a microscope across fiber-optic endfaces of a multi-fiber connector for inspecting the fiber-optic endfaces through the microscope, the device comprising:
   (a) a supporting body having a first end portion for attaching to an optical tube of the microscope and a second end portion extended away from the optical tube of the microscope;
   (b) a pendular arm having a first end rotatably mounted to the second end portion of the supporting body and a second end extended toward the optical tube of the microscope, wherein the pendular arm is rotatable relative to the supporting body and the optical tube about a pendular axis which is parallel with the imaging axis of the microscope;
   (c) a fitting tip attached to the second end of the pendular arm, the fitting tip capable of interfacing with the multi-fiber connector; and
   (d) a bevel wheel with a slanted surface disposed to interface with the supporting body and the pendular arm and is adapted to swing the supporting body relative to the pendular arm, moving the imaging axis relative to the fitting tip along a circular track to selectively align the imaging axis between adjacent fiber-optic endfaces of the multi-fiber connector when interfaced with the fitting tip.

2. The device of claim 1, further comprising a torsion spring disposed between the supporting body and the pendular arm for pushing the pendular arm relative to the supporting body in a rotational direction.

3. The device of claim 2, wherein the slanted surface of the bevel wheel is flat or spiral.

4. The device of claim 2, wherein the bevel wheel is fastened to the supporting body; and a bulge is formed on a side of the pendular arm for contacting the slanted surface of the bevel wheel.

5. The device of claim 2, wherein the bevel wheel is fastened to the pendular arm; and a bulge is formed on a side of the supporting body for contacting the slanted surface of the bevel wheel.

6. The device of claim 2, wherein a front end of the fitting tip is shaped for tightly mating with a front end of the multi-fiber connector to be interfaced with the fitting tip.

7. The device of claim 2, wherein the distance Rb between the pendular axis and the imaging axis of the microscope has a value between Ra and Rc, wherein Ra is the distance between the pendular axis and the midpoint of a line connecting center points of two outermost fiber-optic endfaces of the multi-fiber connector when interfaced with the fitting tip; and Rc is the distance between the pendular axis and a center point of an outermost fiber-optic endface of the multi-fiber connector when interfaced with the fitting tip.

8. The device of claim 1, wherein the slanted surface of the bevel wheel is flat or spiral.

9. The device of claim 1, wherein the bevel wheel is fastened to the supporting body; and a bulge is formed on a side of the pendular arm for contacting the slanted surface of the bevel wheel.

10. The device of claim 1, wherein the bevel wheel is fastened to the pendular arm; and a bulge is formed on a side of the supporting body for contacting the slanted surface of the bevel wheel.

11. The device of claim 1, wherein a front end of the fitting tip is shaped for tightly mating with a front end of the multi-fiber connector to be interfaced with the fitting tip.

12. The device of claim 1, wherein the distance Rb between the pendular axis and the imaging axis of the microscope has a value between Ra and Rc, wherein Ra is the distance between the pendular axis and the midpoint of a line connecting center points of two outermost fiber-optic endfaces of the multi-fiber connector when interfaced with the fitting tip; and Rc is the distance between the pendular axis and a center point of an outermost fiber-optic endface of the multi-fiber connector when interfaced with the fitting tip.

13. The device of claim 1, wherein a front end of the fitting tip is shaped for tightly mating with a front end of the multi-fiber connector to be interfaced with the fitting tip.

14. The device of claim 13, further comprising a torsion spring disposed between the supporting body and the pendular arm for pushing the pendular arm relative to the supporting body in a rotational direction.

* * * * *